Sept. 17, 1940.  A. M. WHITE  2,215,023
CHOKER AND BUTT HOOKS
Filed July 31, 1939  2 Sheets-Sheet 2
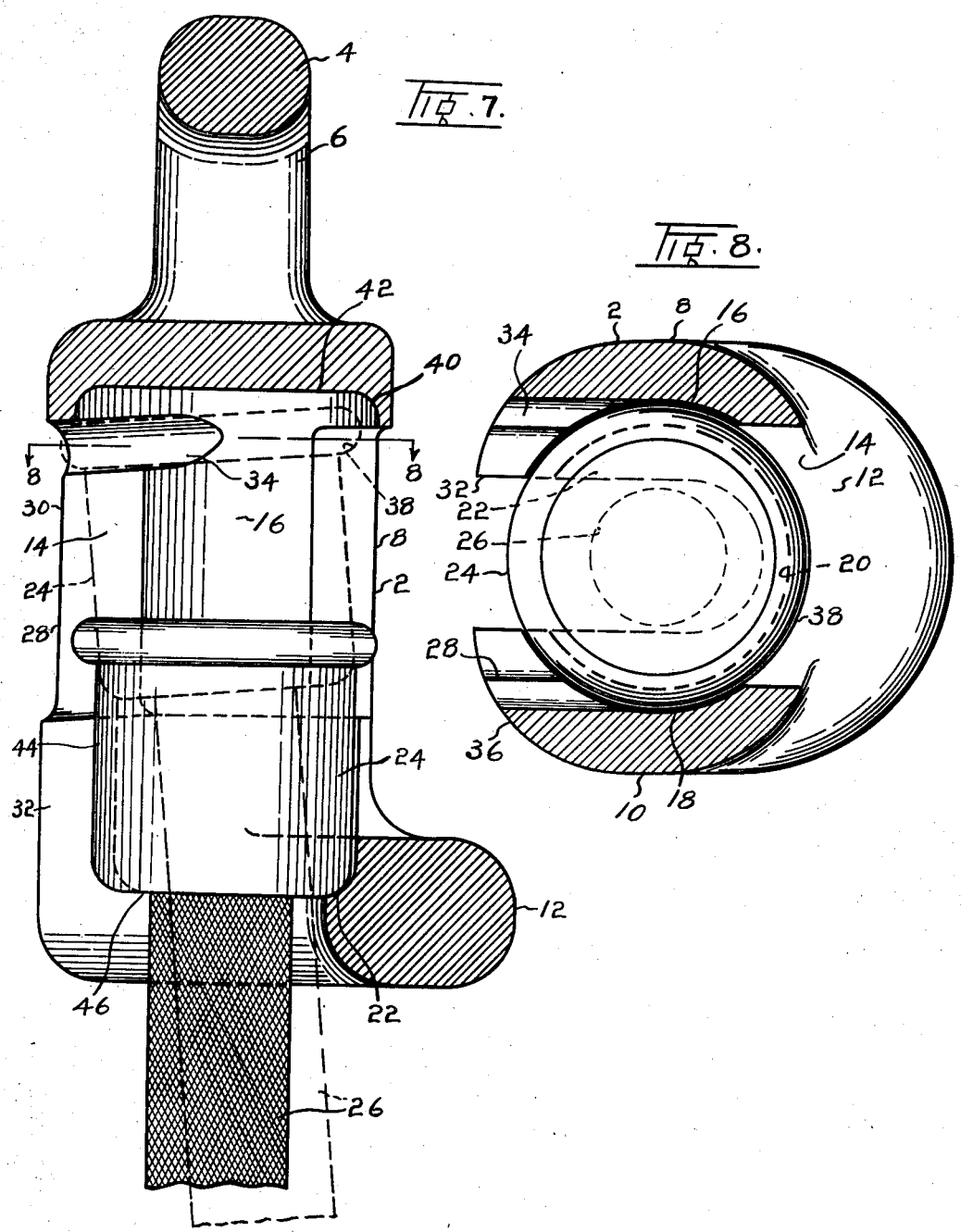
INVENTOR.
ALFRED. M. WHITE.
Ernest E Carver
ATTORNEY.

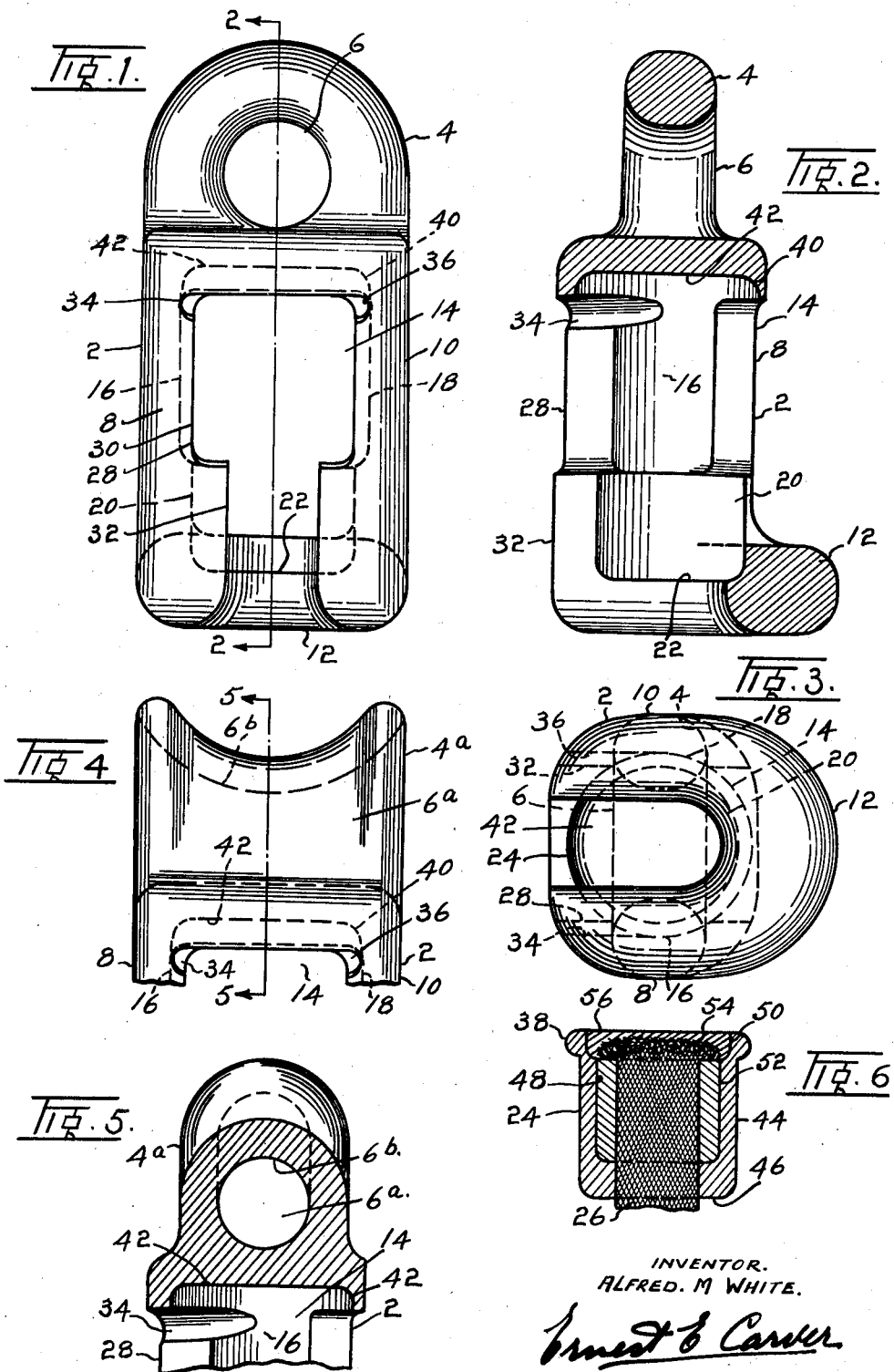

Patented Sept. 17, 1940

2,215,023

UNITED STATES PATENT OFFICE 2,215,023

CHOKER AND BUTT HOOKS

Alfred M. White, Vancouver, British Columbia, Canada

Application July 31, 1939, Serial No. 287,537
In Canada February 7, 1938

10 Claims. (Cl. 294—74)

The present invention relates to logging hooks, and more in particular to choker and butt hooks for connecting the ends of a cable line.

In the logging industry it is the usual practice to use a cable or choker line, generally of wire rope, having enlargements or ferrules at the ends thereof for connecting the same to hooks. It is the practice to attach one end of the cable to a butt end hook which can then be connected to the hauling means, and to attach the other end of the cable to a choker hook running on the cable line, thus forming a loop passing around the logs to be hauled by the hauling means. These hooks are subjected to severe use and must not only be of suitable design from the standpoint of structural requirements, but must be so designed that the ends of the cables can be readily and easily connected thereto or disconnected therefrom, yet having such features in said design that once the ends of the cable are seated therein the same will not become accidentally disengaged therefrom during operation of the cable or when slack in the cable line permits relative movement between the enlargement and these hooks.

It is an object of the present invention to provide an improved construction for a cable or butt hook whereby the cable enlargement may be readily and easily connected to or disconnected from such hooks, yet preventing accidental displacement of the cable and hook even though relative movement between these two takes place because of slack in the cable.

More particularly, the present invention is directed to a design for choker or butt hook which permits movement of the cable enlargement substantially transversely in respect to the axis of the hook when the same is moved into interlocking relation therewith, the improvements in this type of hook taking the form of a projection or laterally extending bead on the ferrule or enlargement at the end of the cable adapted to be received by and cooperate with oppositely disposed channels on the body of the hook, which channels are inclined in respect to a plane substantially normal to the axis of the body and communicate with the body cavity. With this design the bead or projection of the cable ferrule or enlargement is initially received by such channels upon movement of the enlargement substantially transversely of the body, after which the ferrule is received by the axially disposed cavity in which the same seats for locking engagement with the hook. Furthermore, the improved design includes a dome or recess extending upwardly beyond said bead receiving channels, which dome or recess is provided with a wall in a plane at an angle to the plane of said bead receiving channels, thereby permitting a beaded head of the ferrule or enlargement to move axially beyond or above the level of the channels which form the passage into and out of the cavity of the hook, thereby lessening the chances of the ferrule in its unintended upward movement from stopping or registry with the exit channels.

Still another object of the present invention is to provide a novel construction for a cable enlargement or ferrule, advantage being taken of the bead or projection on the ferrule to increase the cavity or recess thereof adjacent the open end and to provide additional space for properly anchoring the end of the cable to provide a better purchase for the filler used in holding the cable end in place so as to prevent the cable from escaping.

Other objects, features, capabilities and advantages are comprehended by the invention, as will later appear and as are inherently possessed thereby.

Referring to the drawings:

Figure 1 is a view in elevation of a butt hook made in accordance with the present invention.

Figure 2 is a view in cross-section taken in the plane represented by line 2—2 of Figure 1 of the drawings.

Figure 3 is a bottom plan view of the butt hook shown in Figure 1 of the drawings.

Figure 4 is a fragmentary view in elevation corresponding to the view shown in Figure 1 and disclosing the construction of the top portion of a choker hook.

Figure 5 is a fragmentary view in cross-section taken in the plane represented by line 5—5 of Figure 4 of the drawings.

Figure 6 is a view in cross-section of a cable enlargement or ferrule disclosing improvements in accordance with the present invention and showing a method of attaching the same to a cable end.

Figure 7 is an enlarged cross-sectional view substantially corresponding to Figure 2 of the drawings and disclosing a cable enlargement seated therein and showing also in dotted lines the position of the cable enlargement when disposed in the channels of the hook; and Figure 8 is a view in cross-section taken in the plane represented by line 8—8 of Figure 7 of the drawings.

Referring now more in detail to the drawings, a butt hook incorporating improvements in accordance with the present disclosure is shown in Figures 1 to 3 inclusive and 7 and 8 as comprising a unitary body 2 having a reeveway or end connection 4 provided with the aperture 6 for receiving a cable in a well-known manner. This unitary body is provided with the side walls 8 and 10 depending from the end connection 4, the same being integrally connected by the cross member 12. The body is formed with a cavity, generally referred to as 14, formed in part by the axially disposed channels or grooves 16 and 18 on the inner face of walls 8 and 10, respectively, which channels at their lower extremities merge with a socket 20 formed in part in the side walls 8 and 10 and in part by cross member 12 to provide a seat 22 for a cable enlargement or ferrule 24, as clearly disclosed in Figure 7 of the drawings, this enlargement or ferrule being connected or secured to the end of a cable 26, as more particularly shown in Figure 6 of the drawings.

The hook body 2 is provided with an opening 28 communicating with the body cavity 14 and which opening comprises a relatively large part 30 and a relatively narrow part 32, which narrow part 32 extends transversely of the body to terminate in the cross member 12. It will therefore be seen that opening 30 permits movement of the cable and cable enlargement transversely with respect to the axis of the hook body for movement of the cable enlargement into seating relation with the seat 22.

The improved design of the present embodiment as disclosed in the drawings resides more particularly in providing the relatively transversely extending channels 34 and 36 formed on the inside faces of the walls 8 and 10, respectively, the same communicating with the channels 16 and 18 at their inner ends and forming at their outer ends a part of the opening 30 which receives the cable enlargement or ferrule. These channels 34 and 36 are inclined downwardly from right to left, as viewed in Figures 2 and 7, with respect to a plane substantially normal to the axis of the hook body. These channels are so formed and designed as to receive the beaded end 38 of the cable enlargement or ferrule 24 when the axis of the cable end and enlargement is inclined to the axis of the hook body as disclosed in dotted lines in Figure 7 of the drawings. By transverse movement of the cable enlargement in respect to the axis of the hook, the cable enlargement is moved into the body cavity whereby the beaded end 38 is received in the channels 16 and 18, after which the cable end and enlargement may be moved axially downwardly whereby the ferrule 24 seats in the socket 20 providing the seat 22 for said ferrule.

Figures 4 and 5 disclose a choker hook which corresponds in all essential respects to the butt hook as above described and accordingly similar reference numerals indicate corresponding parts. This choker hook, however, is constructed with a reeveway 4a varying in construction somewhat from the reeveway 4 and providing a passageway 6a which has an arcuate upper contour as at 6b to facilitate movement of the hook as the same moves along the cable.

It will be clearly appreciated that by providing the beaded end 38 on the cable ferrule and the cooperating channels 34 and 36 on the opposite walls of the hook body and inclining said channels with respect to the axis of the hook body, the cable ferrule may be inserted into seating relation with the hook only in a given position so that although the two may be engaged and disengaged conveniently and readily when the cable enlargement is turned with respect to the axis of the hook body whereby proper registry may be had between the beaded end 38 and the channels 34 and 36, such registration of the beaded end and the channels 34 and 36 will not take place under usual conditions when the ferrule is disposed within the body cavity even though the same has an unintended upward and axial movement with respect to the hook body. However, the present illustrative embodiment includes additional structural features which further prevent any tendency for the beaded end 38 of the ferrule from stopping in registry with the channels 34 and 36 if such unintended upward movement of the ferrule takes place within the body cavity. This feature of construction includes the recess or dome 40 communicating with the channels 16 and 18 at their upper extremities, said recess taking the form of the beaded end of the ferrule 24 and having the wall 42 thereof in a plane substantially at a right angle to the axis of the hook body and therefore angularly disposed in respect to said channels 34 and 36. This recess therefore receives the beaded end 38 of the ferrule 24 should the same move axially and upwardly in the body cavity and tends to prevent the beaded end 38 of the ferrule stopping in registry with said channels, thus further preventing unauthorized disengagement of the cable enlargement from the hook.

As shown in Figures 6 to 8 inclusive of the drawings, the cable enlargement or ferrule is of substantially cylindrical formation having the cylindrical wall 44 connected at one end by the apertured end wall 46 to provide an interior recess 48 having its open end adjacent the beaded end 38 of the ferrule. Advantage is taken in the present construction of the beaded end 38 to provide said recess 48 with a bore diameter as at 50 substantially greater than the bore diameter as at 52, which bore diameter 50 extends to a depth corresponding substantially to that of the bead 38 and which provides additional room for anchoring the free ends 54 of the cable 26. The cable 26 is anchored to the ferrule 24 by packing zinc or Babbitt metal 56, or some other equivalent material, within the recess 48 and around the cable end 26, after which the loose wires of the cable at the top and adjacent the beaded end 38 can be pounded down into this part of the recess having the enlarged diameter as at 50 to prevent any possibility of the wire pulling out of the ferrule.

While I have herein described and upon the drawings shown an illustrative embodiment of the invention, it is to be understood that the invention is not limited thereto but may comprehend other constructions, arrangement of parts, details and features within the scope of the claims without departing from the spirit of the invention.

What I claim as my invention is:

1. A logging hook comprising a unitary body having an interior socket provided with a seat for reception of a cable enlargement, said body having an opening adapted to permit the entrance of said cable enlargement substantially transversely with respect to the vertical axis of said hook, said opening being formed in part by a channel disposed in said body, said channel extending downwardly and outwardly from the axis of said hook.

2. A logging hook comprising a unitary body having an interior socket provided with a seat for reception of a cable enlargement, said body having an opening adapted to permit the entrance of said cable enlargement substantially transversely with respect to the vertical axis of said hook, said opening being formed in part by oppositely disposed channels in said body, said channels extending downwardly and outwardly from the axis of said hook.

3. A logging hook comprising a unitary body having an interior socket provided with a seat for reception of a cable enlargement, said body having an opening adapted to permit the entrance of said cable enlargement substantially transversely with respect to the vertical axis of said hook, said opening being formed in part by a channel disposed in said body and extending relatively transversely to said axis.

4. A logging hook comprising a unitary body having an interior socket provided with a seat for reception of a cable enlargement, said body having an opening adapted to permit the entrance of said cable enlargement substantially transversely with respect to the vertical axis of said hook, said opening being formed in part by oppositely disposed channels in said body and extending relatively transversely to said axis.

5. A logging hook comprising a unitary body having an interior socket provided with a seat for reception of a cable enlargement, said body having an opening adapted to permit the entrance of said cable enlargement substantially transversely with respect to the vertical axis of said hook, said opening being formed in part by oppositely disposed channels in said body and being inclined downwardly and outwardly from said axis, and said body having an axial recess above said channels capable of enclosing the upper end of the cable enlargement.

6. A logging hook comprising a unitary body having an interior socket provided with a seat for reception of a cable enlargement, said body having an opening adapted to permit the entrance of said cable enlargement substantially transversely with respect to the vertical axis of said hook, said opening being formed in part by oppositely disposed channels in said body, said channels being inclined downwardly and outwardly from said axis, and said body having a recess provided with a surrounding wall said recess being disposed above the channels.

7. A logging hook comprising a unitary body having oppositely disposed walls provided with channels merging at their lower extremities in a socket provided with a seat for reception of a cable enlargement, said body having an opening communicating with said channels adapted to permit the entrance of said cable enlargement substantially transversely with respect to the vertical axis of said hook, said opening being formed in part by a channel disposed in each of said walls and extending transversely with respect to and intersecting said first-named channels, said first-named channels terminating at their upper extremities in a walled recess.

8. A logging hook comprising a unitary body having oppositely disposed walls provided with channels merging at their lower extremities in a socket provided with a seat for reception of a cable enlargement, said body having an opening communicating with said channels adapted to permit the entrance of said cable enlargement substantially transversely with respect to the vertical axis of said hook, said opening being formed in part by a channel disposed in each of said walls and extending transversely with respect to and intersecting said first-named channels and being inclined downwardly and outwardly from said axis, and said first-named channels merging at their upper extremities in a walled recess.

9. A logging hook comprising a unitary body having oppositely disposed walls provided with channels merging at their lower extremities in a socket provided with a seat for reception of a cable enlargement, said body having an opening communicating with said channels adapted to permit the entrance of said cable enlargement substantially transversely with respect to the vertical axis of said hook, said opening being formed in part by a channel disposed in each of said walls and extending transversely with respect to and intersecting said first-named channels and being inclined downwardly and outwardly from said axis, and said first-named channels merging at their upper extremities in a recess having a wall spaced above said last-named channels and in a plane substantially at a right angle to said vertical axis.

10. A logging hook comprising a unitary body having oppositely disposed walls provided with channels merging at their lower extremities in a socket provided with a seat for reception of a cable enlargement, said body having an opening communicating with said channels adapted to permit the entrance of said cable enlargement substantially transversely with respect to the vertical axis of said hook, said opening being formed in part by a channel disposed in each of said walls and extending transversely with respect to and intersecting said first-named channels and being inclined downwardly and outwardly from said axis, and said first-named channels merging at their upper extremities in a recess having a wall spaced above said last-named channels and in a plane substantially at a right angle to said axis.

ALFRED M. WHITE.